US006938207B1

(12) United States Patent
Haynes

(10) Patent No.: US 6,938,207 B1
(45) Date of Patent: Aug. 30, 2005

(54) METHOD AND SYSTEM FOR INDICATING DOCUMENT TRAVERSAL DIRECTION IN A HYPER LINKED NAVIGATION SYSTEM

(75) Inventor: Thomas Richard Haynes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 09/619,555

(22) Filed: Jul. 19, 2000

(51) Int. Cl.$^7$ .............................. G06F 17/00; G06F 3/00
(52) U.S. Cl. ...................... 715/711; 715/817; 715/818; 715/819; 715/820; 715/712; 715/855
(58) Field of Search ................................ 345/347, 700, 345/764, 817–820, 810, 821–823, 829, 835, 345/853–857, 860, 862, 711, 749, 712; 709/203; 715/711, 712, 817–820, 829, 853–857

(56) References Cited

U.S. PATENT DOCUMENTS

| | | | |
|---|---|---|---|
| 5,136,690 A | 8/1992 | Becker et al. | 395/161 |
| 5,630,081 A | 5/1997 | Rybicki et al. | 395/348 |
| 5,708,767 A * | 1/1998 | Yeo et al. | 345/440 |
| 5,806,077 A * | 9/1998 | Wecker | 345/804 |
| 5,821,927 A | 10/1998 | Gong | 345/335 |
| 5,848,424 A | 12/1998 | Scheinkman et al. | 707/501 |
| 5,870,769 A | 2/1999 | Freund | 707/501 |
| 5,877,766 A * | 3/1999 | Bates et al. | 345/854 |
| 5,890,170 A | 3/1999 | Sidana | 707/501 |
| 5,908,467 A | 6/1999 | Barrett et al. | 709/218 |
| 5,995,101 A * | 11/1999 | Clark et al. | 345/711 |
| 6,049,812 A * | 4/2000 | Bertram et al. | 707/516 |
| 6,067,565 A * | 5/2000 | Horvitz | 709/218 |
| 6,070,176 A * | 5/2000 | Downs et al. | 345/848 |
| 6,072,490 A * | 6/2000 | Bates et al. | 345/821 |
| 6,085,226 A * | 7/2000 | Horvitz | 709/203 |
| 6,356,908 B1 * | 3/2002 | Brown et al. | 707/10 |
| 6,385,641 B1 * | 5/2002 | Jiang et al. | 709/203 |
| 6,542,163 B2 * | 4/2003 | Gorbet et al. | 345/711 |
| 6,557,015 B1 * | 4/2003 | Bates et al. | 715/501.1 |
| 6,570,587 B1 * | 5/2003 | Efrat et al. | 345/723 |

OTHER PUBLICATIONS

Yoneda et al., A New Communication Tool: Time Dependent Multimedia Document, 1992, IEEE, pp. 90-97.*
Internet Explorer Screen Capture (figures 1-5).*
IBM Technical Disclosure Bulletin "Multimedia Web Cluster Analysis", vol. 36, No. 09B, Sep., 1993, I. R. Eisen and S. N. Parikh.
Research Disclosure, "Automatically Guiding Hyperlinked Document", May 1993.

* cited by examiner

Primary Examiner—Ba Huynh
Assistant Examiner—Truc T Chuong
(74) Attorney, Agent, or Firm—A. Bruce Clay; Yee & Associates, P.C.

(57) ABSTRACT

A direction indicator for navigating within a web site is installed relative to a link shown on a web page within the web site. The direction indicator is surfaced prior to selection of the link in order to inform the user whether the link will take the user forward or backward within the web site. The direction indicator may comprise an arrow. The arrow points upward to indicate movement backward within the web site, and the arrow points downward to indicate movement forward within the web site. The direction indicator may be surfaced by hovering a pointing device over the link.

18 Claims, 3 Drawing Sheets

# METHOD AND SYSTEM FOR INDICATING DOCUMENT TRAVERSAL DIRECTION IN A HYPER LINKED NAVIGATION SYSTEM

FIELD OF THE INVENTION

This invention relates in general to computer software, and in particular to a method and system for indicating a document traversal direction in a hyper linked navigation system.

BACKGROUND OF THE INVENTION

In the modern networked world of the Internet and World Wide Web, users are accustomed to changing browser views by clicking on 'jump' objects (hyperlinks). Often these jumps result in a view on a new object orthogonal to the original object (un-related in a contextual manner). For instance, the user might be perusing some business e-commerce web site that happens to list links to 'related sites'. The user might click on one and be taken to a storefront for a totally different company.

Sometimes, however, a hyperlink takes the user to another place in the same superset object. For instance, the user might be reading a chapter in an online book. The link might be to another section of the book, however, the user has no way of knowing whether the link will take him BACK or FORWARD in the book.

One of the great capabilities of information in a networked world is the ability of a user to easily jump amongst spots in a view of an object, without the need to traverse in a more linear fashion through the object. However, in the case of an online book, sometimes the user would like to know before making the 'leap' (following the link), which direction he will be going in a linear view of the book. The user might not want to follow the link if it would take him forward, since he might be reading the book "the old-fashioned" way (front to back). However, if the link takes him backward, he might want to follow it, to re-enforce some concept he has already seen but perhaps not sufficiently remembered.

SUMMARY OF THE INVENTION

A method, system and computer program product for navigating within a web site is provided. A direction indicator is installed relative to a link shown on a web page within the web site. The direction indicator is surfaced prior to selection of the link in order to inform the user whether the link will take the user forward or backward within the web site. In one embodiment, the direction indicator comprises an arrow. The arrow points upward to indicate movement backward within the web site, and the arrow points downward to indicate movement forward within the web site. Surfacing the direction indicator may be accomplished by hovering a pointing device over the link.

In one embodiment, the user is provided with a toggle capability that will only allow an indicator in one direction, i.e. the link will only activate if the user is taken backward. One example of installing an indicator comprises extending an HTML tag language by adding an attribute for an HTML BODY tag.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
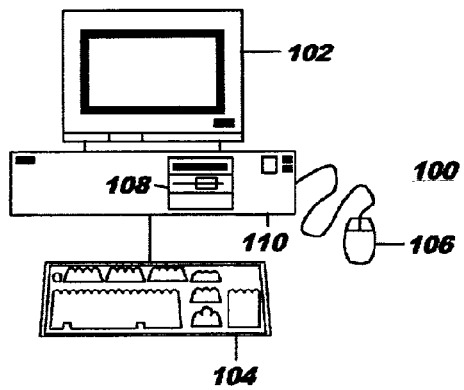
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer or such as other web-enabled devices such as hand-held wireless PDA's and cell phones. Computer 100 also preferably includes a graphical user interface that may be implemented by means of systems software residing in computer readable media in operation within computer 100.

Figure 2:
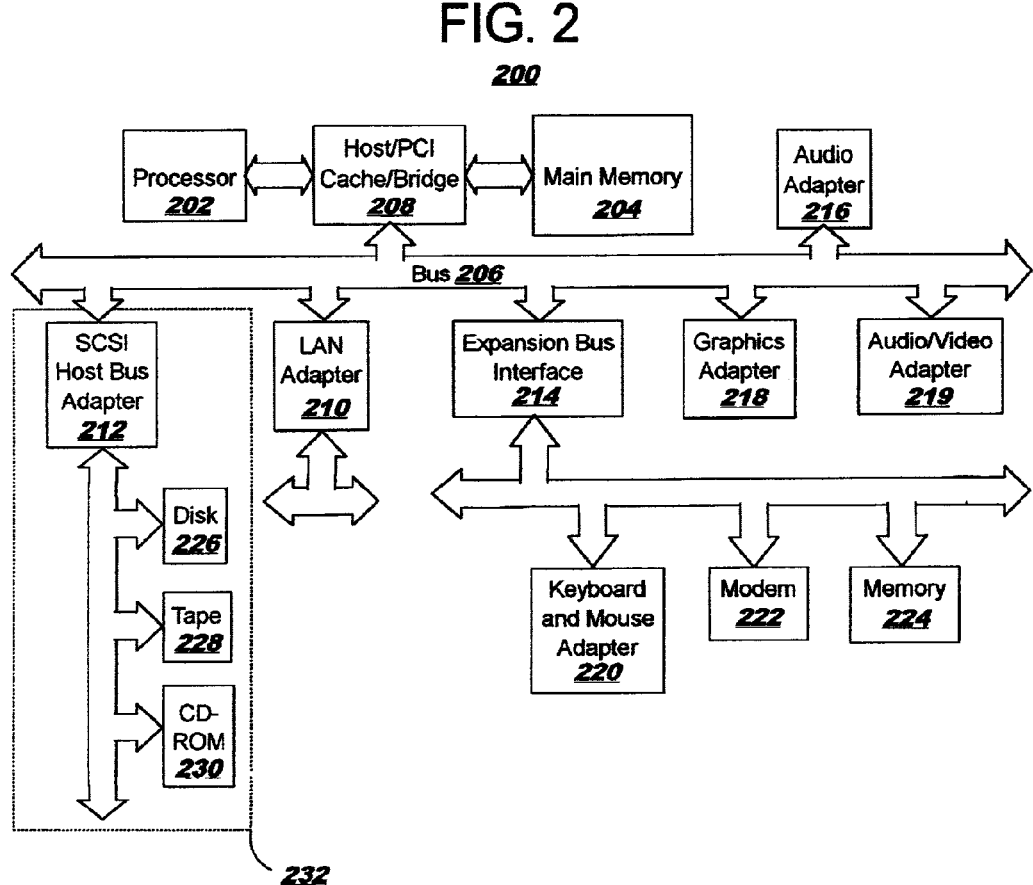
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP), Industry Standard Architecture (ISA), and Extended Industry Standard Architecture (EISA), may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device, which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figure 3:
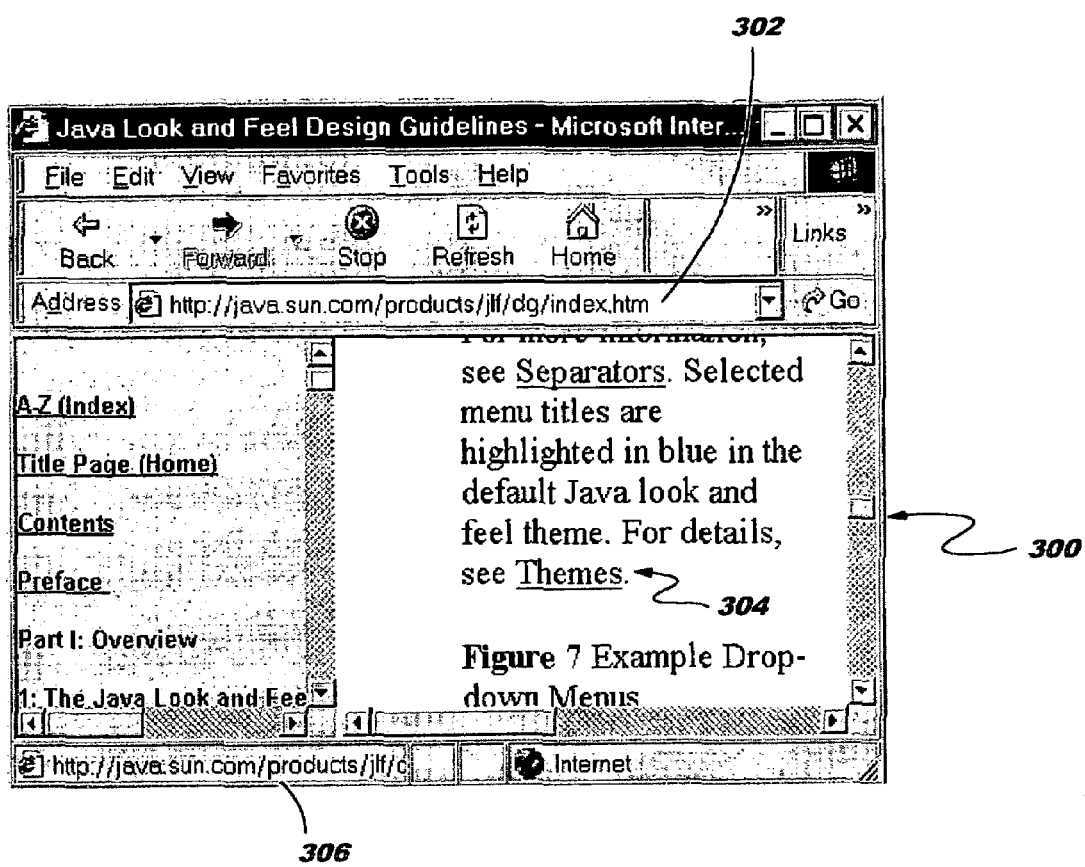
FIG. 3 illustrates navigation techniques known in the prior art.

Referring now to FIG. 3, the current art is illustrated. A web page 300 located at a URL 302 is shown. In order to navigate through the page 300, a user can (among other things) click on a link such as, for example, Themes, as generally indicated by reference numeral 304. Prior to clicking on the link, the user can 'hover' a mouse pointer over the link and be provided with the URL of the page that will be 'jumped' to by clicking thereon. In the illustrated example of FIG. 3, the user can see that the new URL 306 is located at the same site as the page 300. However, the user does not know whether the new page is 'forward' or 'backward' within the site. If the user is reading an online book, there may be no desire to jump forward and ruin the story. However, if the link goes backward, there may be some information which the user would like to have refreshed. Under the prior art, this is not possible to determine other than by making the jump.

The present invention is an extension to the web information standards (e.g. HTML/XML) that would be honored by Internet browsers (e.g. Netscape). The extension would allow the user to know in advance whether a link would result in a forward or a backward movement. This indication could be provided in numerous ways, and the present invention is not limited to any one implementation solely. For purposes of explanation, one way for such an indicator would be to show an 'up' or a 'down' arrow in the status line text commonly displayed when a user hovers the mouse pointer over a link. This up or down arrow would tell the user which way he'll go in the book if he follows the link.

One way to extend the HTML tag language for a feature like this would be to add an attribute for the BODY tag such as 'DIRECTION=YES|NO'. If it is not present, assume NO. If it is tagged as YES, then when a user hovers the mouse over a tag, the browser will attempt a 'smart' estimate of whether the link takes the user forward or back. If the link is to another spot in the same .HTM file, this is an easy task. If it is to another file, then the HTML author will need to help the browser by providing some sort of meta-tagged profile of related files and their relative positioning. For instance, if a book is divided into 6 chapters, and each chapter has its own .HTM file, then there might be another new HTML tag that allows the author to express the relationship as follow:

<fileorder>
  chapter1.htm;
  chapter2.htm;
  chapter3.htm;
  chapter4.htm;
  chapter5.htm;
  chapter6.htm;
</fileorder>

The browser knows that everything following the fileorder tag, until it's 'end' tag, is a list of ordered files separated by semicolons. Further, if a link in chapter 2 would take the user to a spot in chapter 4, it could now, based on the 'fileorder' statement, be determined with assurance that the link is a 'forward' link. The writer/programmer can, of course, name the files anything, as long as the names match the ordering specification detailed in the new <fileorder>_tagging as described.

Additionally, by adding the ability for a user to toggle a setting that causes any link that is determined to be 'forward' to be "turned off", the user would be provided with the advantage of not being forced to pre-determine if a link is forward or backward. With this setting on, all links will either be backward or non-directive (orthogonal).

Figure 4:
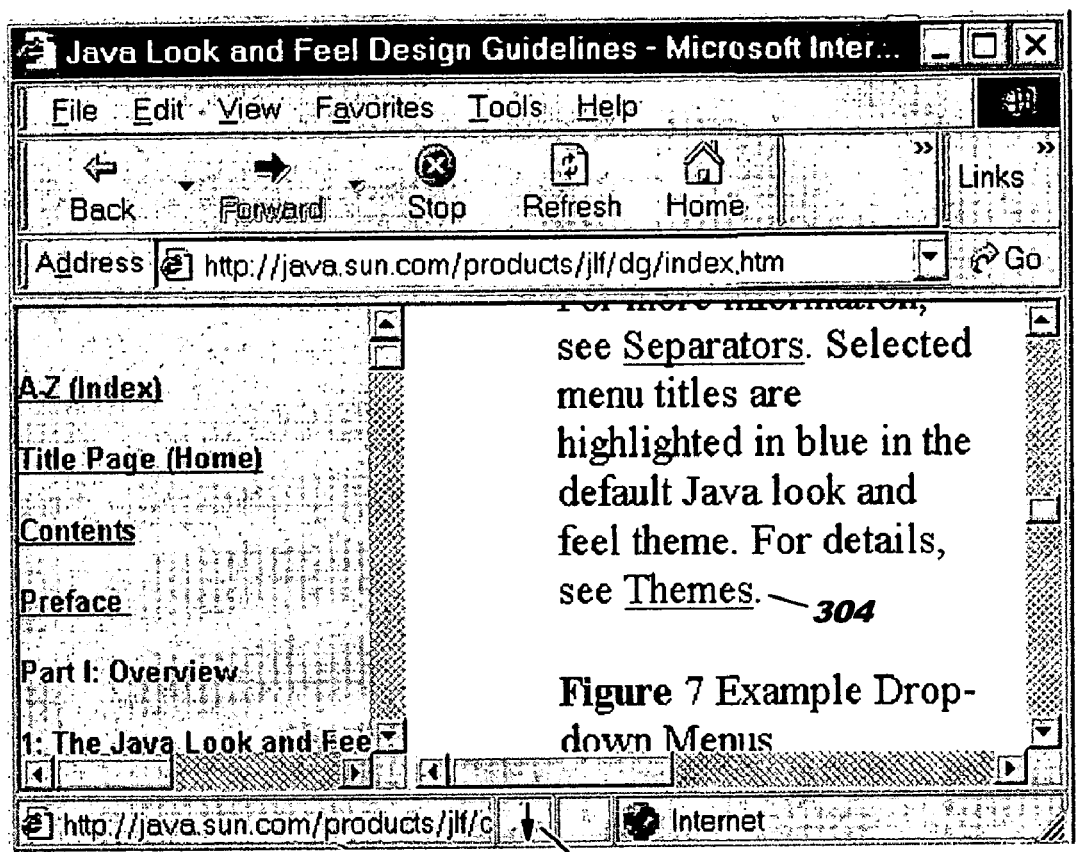
FIG. 4 illustrates the present invention.

Referring to FIG. 4, a direction indicator 400 has been added to the example as discussed in relation to FIG. 3. In this example, when the user 'hovers' the mouse pointer over the link 304, the user can readily see by the indicator 400 that by following the link 304, the user will travel in a down linear direction. Thus, the user knows that the link goes forward in the text. Similarly, although not shown, the appearance of an up arrow would indicate that the user will travel in an upward linear direction. Thus, the user knows that the link goes backward in the text. Therefore, the advantage of the present invention to a user is quite obvious in that the user will know before selecting a link whether the link goes forward or backward in the a web site.

Although the present invention has been described with respect to a specific preferred embodiment thereof, various changes and modifications may be suggested to one skilled in the art and it is intended that the present invention encompass such changes and modifications as fall within the scope of the appended claims.

What is claimed:

1. A method of logically navigating within a multi-page HTML document on a web site, comprising the steps of:

installing a direction indicator relative to a reference link shown on a currently viewable page within the document on the web site;

surfacing said direction indicator prior to selection of said reference link in order to inform the user whether said link is logically forward or backward relative to content within the currently viewable page within the multi-page HTML document.

2. The method of claim 1, wherein said step of installing a direction indicator includes installing an arrow.

3. The method of claim 2, wherein said arrow points upward to indicate movement backward and said arrow points downward to indicate movement forward within the multi-page HTML document.

4. The method of claim 1, wherein said step of surfacing said direction indicator comprises hovering a pointing device over said link.

5. The method of claim 1, wherein said step of installing further includes the step of providing the user with a toggle capability to only allow an indicator in one direction.

6. The method of claim 1, wherein said step of installing comprises the step of extending an HTML tag language by addition of an attribute for HTML BODY tag.

7. A system for logically navigating within a multi-page HTML document on a web site, comprising:

means for installing a direction indicator relative to a reference link shown on a currently viewable page within the document on the web site;

means for surfacing said direction indicator prior to selection of said reference link in order to inform the user whether said link is logically forward or backward relative to content within the currently viewable page within the multi-page HTML document.

8. The system of claim 7, wherein said means for installing a direction indicator includes means for installing an arrow.

9. The system of claim 8, wherein said arrow points upward to indicate movement backward and said arrow points downward to indicate movement forward within the multi-page HTML document.

10. The system of claim 7, wherein said means for surfacing said direction indicator comprises means for hovering a pointing device over said link.

11. The system of claim 7, wherein said means for installing further includes means for providing the user with a toggle capability to only allow an indicator in one direction.

12. The system of claim 7, wherein said means for installing comprises means for extending an HTML tag language by addition of an attribute for an HTML BODY tag.

13. A computer program conduct recorded on computer readable medium for logically navigating within a multi-page HTML document on a web site, comprising:

computer readable means for installing a direction indicator relative to a reference link shown on a currently viewable page within the document on the web site;

computer readable means for surfacing said direction indicator prior to selection of said reference link in order to inform the user whether said link is logically forward or backward relative to content within the currently viewable page within the multi-page HTML document.

14. The program product of claim 13, wherein said computer readable means for installing a direction indicator includes computer readable means for installing an arrow.

15. The program product of claim 14, wherein said arrow points upward to indicate movement backward and said arrow points downward to indicate movement forward within the multi-page HTML document.

16. The program product of claim 13, wherein said computer readable means for surfacing said direction indicator comprises computer readable means for hovering a pointing device over said link.

17. The program product of claim 13, wherein said computer readable means for installing further includes computer readable means for providing the user with a toggle capability to only allow an indicator in one direction.

18. The program product of claim 13, wherein said computer readable means for installing comprises computer readable means for extending an HTML tag language by addition of an attribute for an HTML BODY tag.

\* \* \* \* \*